United States Patent [19]
Schoenberg et al.

[11] Patent Number: 5,247,066
[45] Date of Patent: Sep. 21, 1993

[54] ALKALINE CORRUGATING ADHESIVE COMPOSITION

[75] Inventors: Jules E. Schoenberg, Scotch Plains; Michael Foran, Somerville, both of N.J.

[73] Assignee: National Starch and Chemical Investment Holding Corporation, Wilmington, Del.

[21] Appl. No.: 751,890

[22] Filed: Aug. 29, 1991

[51] Int. Cl.$^5$ .............. C09J 11/04; C09J 103/02; C09J 161/02; C08G 2/28
[52] U.S. Cl. ................................ 528/491; 524/47; 524/49; 524/843; 106/213; 156/328; 523/208; 528/487
[58] Field of Search ............... 106/213; 524/49, 47, 524/843; 523/208; 528/491; 156/328

[56] References Cited
U.S. PATENT DOCUMENTS

| | | | |
|---|---|---|---|
| 3,019,120 | 3/1962 | Bauer et al. | 106/213 |
| 3,294,716 | 7/1966 | Pinney | 260/17.2 |
| 3,355,307 | 4/1967 | Schoenberger et al. | 106/213 |
| 3,487,033 | 2/1969 | McElmury et al. | 260/17.3 |
| 4,343,654 | 3/1982 | Ware et al. | 106/213 |
| 4,366,275 | 2/1982 | Silano et al. | 524/47 |
| 5,079,067 | 1/1992 | Willging | 428/182 |

FOREIGN PATENT DOCUMENTS 3228667 2/1984 Fed. Rep. of Germany ........ 524/49
2645554A 4/1983 France .

OTHER PUBLICATIONS

CA 87(22):168761u-JP5-2015595; Feb. 5, 1977; Showa.
CA 81(14):78905r-JP4-9025108; Mar. 6, 1974; Showa.
JACS 53 pp. 1973-1980 (1931) H. S. Fry and J. H. Payne, The Action of Hydrogen Peroxide Upon Simple Carbon Compounds.

*Primary Examiner*—Paul R. Michl
*Assistant Examiner*—Andrew E. C. Merriam
*Attorney, Agent, or Firm*—Edwin M. Szala; Ellen T. Dec

[57] ABSTRACT

A crosslinking additive for imparting water resistance to starch-based alkaline corrugating adhesive compositions is prepared by reacting acetone and formaldehyde under aqueous alkaline conditions at 20°-80° C. in a molar ratio of from 2 to 5 moles of formaldehyde per mole of acetone. The condensate is thereafter treated with from 1.0 to 2.0 moles of hydrogen peroxide per mole of unreacted formaldehyde which oxidizes the residual formaldehyde to formic acid. The treated crosslinking additive will contain less than 0.4% unreacted formaldehyde and may be added directly to a starch-based corrugating adhesive.

6 Claims, No Drawings

ALKALINE CORRUGATING ADHESIVE COMPOSITION

BACKGROUND OF THE INVENTION

This invention relates to a starch-based, alkaline corrugating adhesive composition containing a crosslinking additive which imparts water resistance thereto and is substantially free of formaldehyde.

The procedures employed in the production of corrugated paperboard usually involve a continuous process whereby a strip of paperboard is first corrugated by means of heated, fluted rolls. The protruding tips on one side of this fluted paperboard strip are then coated with an adhesive, and a flat sheet of paperboard, commonly known in the trade as a facing, is thereafter applied to these tips. By applying heat and pressure to the two paperboard strips thus brought together, an adhesive bond is formed therebetween. The above-described procedure produces what is known to those skilled in the art as a single-faced board in that the facing is applied to only one surface thereof. If a double-faced paperboard is desired, in which an inner fluted layer is sandwiched between two facings, a second operation is performed wherein the adhesive is applied to the exposed tips of a single-faced board and the adhesive-coated tips are then pressed against a second facing in the combining section of the corrugator under the influence of pressure and heat. The typical corrugating process and the use and operation of corrugators in general are described in U.S. Pat. Nos. 2,102,937 and 2,051,025 to Bauer.

Starch-based adhesives are most commonly used in the corrugating process due to their desirable adhesive properties, low cost and ease of preparation.

The most fundamental of starch corrugating adhesives is an alkaline adhesive which is comprised of raw, ungelatinized starch suspended in an aqueous dispersion of cooked starch. The adhesive is produced by gelatinizing starch in water with sodium hydroxide (caustic soda) to yield a primary mix of gelatinized or cooked carrier, which is then slowly added to a secondary mix of raw (ungelatinized) starch, borax and water to produce the full-formulation adhesive. In the corrugating process, the adhesive is applied (usually at between 25° and 55° C.) to the tips of the fluted paper medium or single-faced board, whereupon the application of heat causes the raw starch to gelatinize, resulting in an instantaneous increase in viscosity and formation of the adhesive bond. Such adhesives are described in the above-noted patents to Bauer. Typical "no carrier" starch adhesives are described in U.S. Pat. No. 3,487,033 to McElmury et al. and U.S. Pat. No. 3,355,307 to Schoenberger et al.

It is often desired or necessary in the manufacture of corrugated paperboard that the adhesive yield water-resistant bonds which can withstand extended exposure to high humidity, liquid water, melting ice and the like. A number of approaches have been devised to produce water-resistant corrugating adhesives. One method involves the preparation of an acidic, starch-based adhesive wherein urea-formaldehyde resin is added to the composition, together with an acidic catalyst such as aluminum sulfate, to produce water-resistant bonds in the corrugated board manufactured therewith. The adhesive composition itself, however, is deficient in other important properties such as corrugator bonding speeds, viscosity stability, and pot life and exhibits excessive formaldehyde odor. In addition, acidic corrugating adhesives tend to be corrosive.

The many disadvantages associated with the acidic corrugating adhesives led to the development of water-resistant alkaline curing starch-based adhesives for use in the corrugating industry. In the preparation thereof, a thermosetting resin, such as, e.g., urea-formaldehyde, resorcinol-formaldehyde, melamine-formaldehyde, phenol-formaldehyde, diacetone acrylamide-formaldehyde, ketone-aldehyde and urea-acetone-formaldehyde condensate, is added to the adhesive as a crosslinking additive for the amylaceous components to produce water-resistant bonds. Preferred among these resins for superior water-resistant properties are ketone-formaldehyde condensates as disclosed in U.S. Pat. No. 2,529,851, and particularly acetone-formaldehyde resins. Some adhesives made from such resins, however, suffer from poor pot life and viscosity instability, as well as considerable formaldehyde odor.

In recent years, due to the toxicity of and increasing governmental regulations concerning formaldehyde, serious efforts have been made to reduce the levels of exposure to formaldehyde in the industrial workplace. Acetone-formaldehyde resins such as are employed as crosslinking additives in corrugating adhesives contain about 1.0 to 4.0% free (unreacted) formaldehyde by weight. Prior attempts to reduce formaldehyde levels in crosslinking additives as taught in U.S. Pat. Nos. 3,019,120 and 3,294,716 have not reduced free formaldehyde amounts to a significant extent and/or have resulted in diminution of the degree of water resistance achieved in the bonds formed.

In U.S. Pat. No. 4,366,275 to Silano et al., the crosslinking additive used with the starch-based alkaline corrugating composition comprises a mixture of acetone-formaldehyde condensate and dimethylol dihydroxy ethylene urea (DMDHEU) wherein at least a portion of the DMDHEU present is produced "in situ" by reaction of the free formaldehyde contained in the acetone-formaldehyde condensate with dihydroxy ethylene urea. The patent discloses that the unreacted formaldehyde in the acetone-formaldehyde resin is reduced to about 0.1 to 2% by weight. Experience has shown, however, that in most instances the free formaldehyde is reduced only to a level of about 0.5 to 0.9% by weight of the condensate. Current industry requirements call for still lower levels of unreacted formaldehyde.

Accordingly, it is an object of the present invention to provide a ketone-formaldehyde crosslinking additive with very low levels of free formaldehyde (less than 0.4%, and preferably less than 0.2%. by weight) which, nevertheless, imparts water-resistance, viscosity stability and acceptable pot life to starch-based alkaline corrugating adhesive compositions.

It is another object to provide a water-resistant, starch-based alkaline adhesive composition containing such crosslinking additive in the manufacture of corrugated paperboard.

SUMMARY OF THE INVENTION

The above and related objects are achieved in the use of a crosslinking additive comprised of an acetone-formaldehyde condensate which has been treated with from 1.0 to 2.0 moles of hydrogen peroxide, preferably 1.5 to 2.0 moles of hydrogen peroxide. The hydrogen peroxide oxidizes the residual formaldehyde to formic acid which itself maybe be oxidized to carbon dioxide and water.

The alkaline curing, starch-based corrugating adhesives of this invention comprises:

A. from about 10-40%, preferably 18-35%, based on total weight of the adhesive, of starch, this including the ungelatinized as well as the gelatinized portions of the starch (or in the case of "no-carrier" adhesives, the total starch content);
B. from about 0.3 to 5%, based on total weight of the starch, of an alkali such as, for example, sodium hydroxide;
C. from about 54 to 89%, based on total weight of the adhesive, of water; and
D. from about 0.3 to 12% dry basis, based on total weight of the starch, of low formaldehyde crosslinking additive as described hereinafter.

If desired, small amounts of borax or other boron containing salts, up to about 5% based on total weight of starch, may be added to the adhesive to improve the tackifying properties thereof.

In the process herein described for preparing the low formaldehyde crosslinking additive, acetone and formaldehyde are reacted at about 20°-80° C., preferably 40°-60° C., under aqueous alkaline conditions to produce a water-soluble, acetone-formaldehyde condensate containing about 1-4% by weight of unreacted (free) formaldehyde. The proportion of reactants will ordinarily range from 2 to 5 moles of formaldehyde to 1 mole of acetone. Preferably, the reactants will be employed in molar ratio of 2.5 to 4.5 moles of formaldehyde to 1 mole of acetone. The reaction is monitored for formaldehyde content and when it is below about 3%, the product is cooled to about 25°-45° C. and neutralized with acid such as acetic acid, glacial acetic acid, and formic acid to a pH level of 4.8 to 6.2. Hydrogen peroxide (typically 30% aqueous) is added to the condensate in a stoichiometric amount with respect to the formaldehyde concentration with up to 100% excess. While higher concentrations of hydrogen peroxide may be used, the use of hydrogen peroxide in amounts over 2 moles per each mole of free formaldehyde is not cost justified. The condensate/hydrogen peroxide mixture is then heated to about 70° to 100° C. and maintained within that range from 4 to 10 hours. The formaldehyde content is again monitored. The reaction is ordinarily terminated when the formaldehyde level is 0.4% or less by cooling the mixture and adjustment of the pH level to from 5.0 to 6.0, if needed.

While the use of hydrogen peroxide as an oxidant for reducing free formaldehyde in fabrics finished with certain synthetic resins is known (French Pat. 2 645 554-A to Air Liquide L') it has not heretofore been employed in the preparation of acetone-formaldehyde condensate additives for corrugating adhesive formulations.

DESCRIPTION OF THE PREFERRED EMBODIMENTS

The corrugating adhesive composition of this invention is comprised of starch, water, alkali, the low formaldehyde crosslinking additive, and optionally borax. The starch component, which may be the ungelatinized starch and/or gelatinized carrier starch portion of the adhesive composition herein may be selected from any of the several starches, native or converted, heretofore employed in starch corrugating adhesive compositions. Suitable starches include, for example, those starches derived from corn, potato, waxy maize, tapioca, sorghum, wheat, as well as high-amylose starches, i.e., starches which contain 30% or more by weight of amylose, and the various derivatives of these starches. Hence, among the applicable starches are included the various starch derivatives such as ethers, esters, thin-boiling types prepared by known processes such as mild acid treatments, oxidation, etc. and those derivatives of these starches which have high amylose contents. Preferred starches are those typically employed in corrugating adhesives of the alkaline type.

The starch content of the adhesive can vary considerably depending on several factors such as the intended end-use application of the adhesive and the type of starch used. The total amount of starch employed, including gelatinized and ungelatinized portions of starch, ordinarily will be in the range of about 10-40% by total weight of the adhesive.

The remainder of the adhesive composition is composed of about 0.3-5% of an alkali such as sodium hydroxide, based on total weight of starch, about 0.3-12% on dry basis, preferably 1-5%, of the low formaldehyde crosslinking additive as described below, based on total weight of starch, and about 54-89% of water, based on total weight of the adhesive.

The alkali (base) employed herein is preferably sodium hydroxide; however, other bases may be employed in partial or full replacement of the sodium hydroxide and include, for example, alkali metal hydroxides such as potassium hydroxide, alkaline earth hydroxides such as calcium hydroxide, alkaline earth oxides such as barium oxide, alkali metal carbonates such as sodium carbonate, and alkali metal silicates such as sodium silicate. The alkali may be employed in aqueous or solid form.

In preparing the acetone-formaldehyde condensate, the reaction may be conducted under a nitrogen atmosphere if desired. It will be recognized that the alkalinity and reaction temperature employed must be no greater than is necessary to produce a water-soluble condensate which has not cured into an infusible product. Typically, the pH of the reaction mixture is maintained at about 8-12, preferably 9-11, by incremental addition of a solution of an alkaline agent such as sodium hydroxide. The reaction time depends mainly on the temperature, alkalinity and desired solids content of the reaction mixture but is ordinarily such as to obtain a water-soluble acetone-formaldehyde condensate containing about 1-4% by weight of free formaldehyde. The condensate will typically have a solids content of 40-65% by weight.

The improvement represented by the invention herein resides in adding hydrogen peroxide in an effective amount (up to 100% excess over the stoichiometric amount) to the condensate to oxidize the free formaldehyde. The addition of the hydrogen peroxide to the condensate will ordinarily lower the pH of the mixture to a level of about pH 3.0 to 5.0 due to the acidity of the hydrogen peroxide and the formation of formic acid. The reaction with free formaldehyde and hydrogen peroxide is allowed to proceed at 70°-100° C. until the free formaldehyde level in the reaction mixture is reduced to less than 0.4% by weight of the mixture.

In a variation of this step, the condensate is maintained at an alkaline pH of 7-10 during the reaction with hydrogen peroxide. This can be effected by the addition of a base such as sodium hydroxide. Under these pH conditions, the temperature should be maintained at about 30°-40° C. Higher temperatures and/or higher pH levels are undesirable because they accelerate the decomposition of the hydrogen peroxide.

Some residual hydrogen peroxide may remain (ordinarily less than 0.5% by weight of the mixture), when the oxidation reaction is terminated. The reaction is then ordinarily adjusted to a pH level of 5.0 to 6.0 with sodium hydroxide or other suitable base or acid. Neutral or alkaline pH levels are undesirable because of a tendency of the resin to yield formaldehyde at such pH levels. The crosslinking additive thus produced is suitable for direct use in the starch-based alkaline corrugating adhesive compositions of this invention.

While it is not required, the oxidation of free formaldehyde in the condensate may be catalyzed with, for example, ferric sulfate, ferrous sulfate, ferric acetate, cupric or cuprous sulfate, or other known catalysts for such reactions. Use of ferric sulfate is preferred because of its low toxicity and because it significantly reduces the reaction period needed to arrive at a desired level of free formaldehyde. Ordinarily the catalyst is added in amounts of 10-100 ppm of the reaction mixture.

In addition to the essential ingredients of the adhesive composition herein, any conventional non-chemically functional additives may be incorporated into the adhesive in minor amounts, if desired. Such additives include, for example, wetting agents, proteins, plasticizers, solubilizing agents, rheology modifiers, tackifiers such as borax, water conditioners, penetration control agents, peptizers such as urea, gelatinization temperature modifiers, inert fillers such as clay and finely ground polymers, thickeners such as inorganic colloidal clays, guar, hydroxyethyl cellulose, alginates, polyvinyl alcohol, polymers of ethylene oxide and the like, and emulsions such as polyvinyl acetate.

In the preparation of the adhesive composition herein, a portion of the total starch required in the adhesive is gelatinized in water with caustic soda to form the carrier, which is then slowly added to a mixture of raw starch, borax and water. The crosslinking additives may be added to the raw starch mixture or to the final adhesive mixture as desired.

The adhesive thus obtained can be used to bond single- or double-faced boards using any equipment which is presently employed for the preparation of corrugated board. The adhesive is maintained at a temperature preferably between 25° and 55° C. before its application to the protruding tips of the fluted paper strip. The actual application may be accomplished by the use of glue rolls which are ordinarily employed in most corrugating machines, or one may, if desired, utilize other application methods which may be able to achieve a different distribution of adhesive. Following the application of the adhesive to the fluted paper strip, the latter is then brought into immediate contact with the facing board under the influence of heat and pressure, as is well known in the art. A double-faced board may be subsequently prepared by bringing a second facing in contact with the open fluted surface of the single-faced board by the usual procedures.

The examples which follow illustrate specific embodiments of the invention. In the examples all parts and percentages are given by weight and all temperatures in degrees Celsius unless otherwise noted.

In determining the amount of free formaldehyde contained in the acetone-formaldehyde condensates herein, a titration method was employed whereby a 12 g sample of the condensate is weighed into a 250 ml flask to which is added crushed ice. This is then titrated with 0.10N sodium hydroxide until a pH of 10-10.5 is attained. A sodium sulfite solution of 127 g/l is added in an amount of 50 ml and the resulting solution is titrated with 0.10N hydrochloric acid until the pH noted above is attained. The formula to determine free formaldehyde content of the sample is:

$$\% \text{ Free Formaldehyde} = \frac{(\text{ml } 0.10 \text{ N HCl}) \times 0.30}{\text{weight of sample (g)}}$$

EXAMPLE I

This example illustrates a representative preparation of an acetone-formaldehyde condensate.

In a reaction vessel equipped with a thermometer and means of heating and stirring, 58 g (1 mole) of acetone is combined with 252.3 g (4.2 moles) of 50% aqueous formaldehyde and the solution is heated to 50°-55° C. About 0.7 g of 6.25N sodium hydroxide is added and the mixture is held at 55°-60° C. during the exothermic reaction. An additional 21.8 g of 6.25N sodium hydroxide is added over 2.5-3 hours while maintaining the reaction temperature between 57° and 58° C. The reaction is continued for an additional 0.25 hours and the mixture then analyzed for formaldehyde content. When the formaldehyde concentration is below 2.5%, heating is discontinued and the condensate product is cooled to 40° C. The pH is adjusted to 5-6 with glacial acetic acid.

EXAMPLE II

This example illustrates the oxidation of formaldehyde in the acetone-formaldehyde condensate with hydrogen peroxide.

In a glass, round-bottom flask fitted with a thermometer, condenser and Teflon stirrer, a mixture of 491.4 g of an acetone-formaldehyde condensate (prepared by the method of Example I) which contained 1.1% formaldehyde (moles formaldehyde=0.18), and 40.8 g (0.36 mole) of 30% aqueous hydrogen peroxide was heated at 85° C. for 6 hours. The solution, which contained 0.22% formaldehyde, was cooled and neutralized to a pH of 6.0 using 6.0 ml of 6.25N sodium hydroxide. The hydrogen peroxide concentration was 0.38% by weight of the mixture.

EXAMPLE III

This example illustrates the formaldehyde oxidation reaction employing ferric sulfate as catalyst.

Example II was substantially repeated except that 0.019 g of $Fe_2(SO_4)_3$ hexahydrate was added to the reaction mixture. The formaldehyde concentration of the condensate was 0.13%, by weight, of the mixture after 2.75 hours of heating and 0.05%, by weight, after 4 hours. The solution was then cooled and neutralized to a pH of 6.0 using 15.0 ml of 6.25N sodium hydroxide. The hydrogen peroxide concentration was 0.06% by weight of the mixture.

EXAMPLE IV

In this preparation of low formaldehyde acetone-formaldehyde condensate, a high reaction temperature is employed.

Example II was substantially repeated except that the oxidation reaction was run at 100° C. After a reaction period of 4 hours, the formaldehyde concentration was 0.15%, by weight, of the mixture. The solution was cooled and neutralized to a pH of 6.0 with 5.6 ml of 6.25N sodium hydroxide. The hydrogen peroxide concentration was 0.04% of the mixture.

EXAMPLE V

This example illustrates the use of hydrogen peroxide on an acetone-formaldehyde condensate containing 1.55% formaldehyde.

Example II was substantially repeated except that 350 g of an acetone-formaldehyde condensate containing 1.55% formaldehyde(moles formaldehyde=0.18) was used. After 5 hours of reaction with hydrogen peroxide, the formaldehyde concentration was 0.16%, by weight, of the mixture. The solution was cooled and neutralized to a pH of 6.0 with 4.6 ml of 6.25N sodium hydroxide. The hydrogen peroxide concentration was 0.68% of the mixture.

EXAMPLE VI

In this example, the oxidation is carried out with a small excess of hydrogen peroxide.

A mixture of 350 g of an acetone-formaldehyde condensate which contained 1.55% formaldehyde (moles formaldehyde=0.18) and 30.6 g (0.27 mole) of 30% aqueous hydrogen peroxide was heated at 85° C. for 7 hours. The solution, which contained 0.16% formaldehyde, was cooled and neutralized to pH 6.0 using 5.3 ml of 6.25N sodium hydroxide. The hydrogen peroxide concentration was 0.28%

EXAMPLE VII

In this example, the oxidation of the formaldehyde is run under alkaline conditions.

In a glass, round bottom-flask equipped with a thermometer and pH meter electrodes, a mixture of 350 g of an acetone-formaldehyde condensate containing 1.55% formaldehyde (moles formaldehyde=0.18) and 30.6 g (0.27 mole) of hydrogen peroxide was heated at 30°-35° C. and a pH of 9.5 which was maintained by adding 6.25N sodium hydroxide as needed. After a reaction period of 3.5 hours, the formaldehyde concentration was 0.28%, and the hydrogen peroxide was completely consumed. A total of 18.3 ml of sodium hydroxide was used.

EXAMPLE VIII

This example illustrates a large scale oxidation of formaldehyde in a representative acetone-formaldehyde condensate.

A mixture of 454 lb. of an acetone-formaldehyde condensate, which contained 2.08% free formaldehyde (0.31 pound moles of formaldehyde) and 63 lb. of 33.9% hydrogen peroxide (0.63 pound moles of $H_2O_2$ was heated to 85° C. with gentle stirring. The solution, which analyzed for 0.24% free formaldehyde after 11 hours, was then cooled and neutralized to a pH level of 5.3 with 1 lb. of 25% sodium hydroxide solution. The $H_2O_2$ concentration was 0.68% by weight of the condensate.

EXAMPLE IX (Comparison)

This example illustrates a lowering of free formaldehyde of an acetone-formaldehyde condensate in accordance with the process disclosed in U.S. Pat. No. 4,366,275 to M. Silano et al.

An effective amount (about 32 g) of dihydroxyethylene urea solution of 25% solids is added to 300 g of acetone-formaldehyde condensate prepared as described in Example I. While maintaining a pH of 7.5 and temperature of 35°-40° C., the reaction with the free formaldehyde is allowed to continue until the free-formaldehyde content of the condensate reaches an equilibrium value between 0.5% and 0.9%, by weight, of the mixture. An additional amount of dimethyol dihydroxy ethylene urea is added to the condensate to impart desirable properties in the adhesive containing the condensate.

The solution is then neutralized to a pH level of 5 to 6 using acetic acid. The free formaldehyde concentration of the resultant condensate (as used in the evaluation examples) was 0.5%, by weight, of the mixture.

EXAMPLE X

This example illustrates the preparation of the corrugating adhesives representative of this invention.

Preparation of the Carrier Starch

To 2835.6 g of water was added 1360 g of high amylose corn starch (about 50% amylose by weight) and the resultant slurry was heated to 54° C. with stirring. About 283.6 g of water containing 129.2 g of sodium hydroxide was then added to the slurry and heating was continued for about 15 minutes, after which about 2835.6 g of water was added to cool and dilute the resultant dispersion.

Preparation of Full-formulation Adhesive

The carrier starch dispersion above prepared was added over a 20-minute period to a slurry of 4760 g corn starch, 108.8 g borax ($Na_2B_4O_7.10H_2O$) and 8506.8 g water. The mixture was then stirred for 20 minutes, after which one of the low formaldehyde condensates prepared in Examples III, VI, VIII and IX was added to the entire adhesive or a portion of it to form Adhesives A-E. The additional amount for each of these condensates was 2.8% by weight of condensate solids on starch. Adhesive E served as a comparison (control) containing the condensate of Example I (no oxidation with $H_2O_2$), and Adhesive F served as a control containing no condensate.

EXAMPLE XI

It is well recognized that cooked starch dispersions (and starch dispersion containing a crosslinking agent of the prior art in particular) may tend to thicken with time, and this phenomenon is usually observed in all corrugating adhesives based on such starch dispersions. The corrugating adhesives of this invention exhibit a relatively stable viscosity over a given period of time and are comparable to prior art adhesives.

Table I below describes Adhesives A-E and summarizes the viscosity data of these adhesive compositions. All adhesives were held at 38°-41° C. with mild agitation and tested for their viscosity by a Brookfield Viscometer (at 20 rpm setting) to measure the viscosity in centipoise.

Each adhesive was applied at 6 mil thickness by a Bird applicator to a glass plate and was transferred to sheets of single-face web (of 62 lb/thousand sq ft wet strength liner and 33 lb/thousand sq ft wet strength medium) by means of direct hand pressure. The single-face samples were then placed on top of 62 lb/thousand sq ft wet strength liner and the resultant double-faced board was bonded at 0.25 psi on a hot plate at 177° C. for 5 seconds. The bonded boards were then placed in a conditioning atmosphere of 22° C., 50% relative humidity for 24 hours, after which 2×5 inch samples of each of the boards were placed in water at 22° C. for 24 hours.

At the end of this period, the samples were evaluated by a wet pin adhesion test based on that of the TAPPI Standard T 821 OM 87, using a conventional testing apparatus obtainable from Testing Machines Incorporated, Mineola, N.Y. The test results were recorded in pounds (per 24 inches of glue line) required to separate completely the double-face liner from the single-face web. The results are indicated in Table I, with the highest values representing the best results.

TABLE I

| ADHESIVE | CROSSLINKING CONDENSATE | % FREE HCHO IN CONDENSATE | VISCOSITY (CPS) | WET PIN ADHESION (LBS) |
|---|---|---|---|---|
| A | Ex. III | 0.05% | 750 | 19.6 |
| B | Ex. VIII | 0.24% | 970 | 21.4 |
| C | Ex. VI | 0.16% | 1,180 | 19.1 |
| D | Ex. IX* | 0.50% | 938 | 23.1 |
| E (Control) | Ex. I | 1.75% | 1,905 | 21.4 |
| F (Control) | None | None | 976 | 0 |

*Adhesive D contains a comparison condensate of Example IX.

The wet pin adhesion values obtained here exceed commercially acceptable values and are comparable to those values obtained using water-resistant adhesives of the prior art such as those incorporating the crosslinking additive of Example IX.

In summary, this invention is seen to provide a crosslinking additive with low levels of free formaldehyde which imparts water resistance, viscosity stability and acceptable pot life to starch-based alkaline curing corrugating adhesive compositions.

Now that the preferred embodiments of the present invention have been described in detail, various modifications and improvements thereon will become readily apparent to those skilled in the art. Accordingly, the spirit and scope of the invention are to be limited only by the appended claims, and not by the foregoing specification.

We claim:

1. In a process for preparing a crosslinking additive for imparting water resistance to starch-based corrugating adhesive compositions wherein acetone and formaldehyde are reacted in a molar ratio of 1 mole of acetone to about 2 to 5 moles of formaldehyde under aqueous alkaline conditions at about 20°–80° C. to obtain a water-soluble acetone-formaldehyde condensate containing about 1–4% unreacted formaldehyde, the improvement which comprises adding to said water-soluble acetone-formaldehyde condensate at least an effective amount of hydrogen peroxide to react with the unreacted formaldehyde present therein and allowing the reaction to proceed at about 70°–100° C. at pH 3.0 to 5.0 until the unreacted formaldehyde is reduced to less than about 0.4% by weight of the condensate.

2. The process of claim 1 wherein the reaction of acetone and formaldehyde proceeds at about 40°–60° C. and employing 1 mole of acetone to about 2.5 to 4.5 moles of formaldehyde and a pH of about 8–12.

3. The process of claim 2 wherein 1.0–2.0 moles of hydrogen peroxide are used for 1.0 mole of unreacted formaldehyde and the reaction is carried out in the presence of a catalyst.

4. The process of claim 3 wherein the catalyst is ferric sulfate or ferrous sulfate.

5. The crosslinking additive produced by the process of claim 1.

6. The crosslinking additive produced by the process of claim 3.

* * * * *